United States Patent
Newell

(10) Patent No.: US 8,725,275 B2
(45) Date of Patent: May 13, 2014

(54) APPARATUS, SYSTEMS AND METHODS FOR USER DEFINED POWER CONSERVATION PERIODS

(75) Inventor: Nicholas Newell, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 318 days.

(21) Appl. No.: 12/821,356

(22) Filed: Jun. 23, 2010

(65) Prior Publication Data
US 2011/0320057 A1    Dec. 29, 2011

(51) Int. Cl.
*G05B 11/01* (2006.01)
*G06F 1/00* (2006.01)
*G06F 3/00* (2006.01)

(52) U.S. Cl.
USPC ................... 700/22; 713/324; 725/38

(58) Field of Classification Search
USPC ............... 700/22, 296; 713/324; 725/38
See application file for complete search history.

(56) References Cited

U.S. PATENT DOCUMENTS

| | | | |
|---|---|---|---|
| 5,510,602 A * | 4/1996 | Evans et al. ................... | 235/385 |
| 7,525,289 B2 | 4/2009 | Janik et al. | |
| 2003/0135772 A1* | 7/2003 | Haulk et al. ................... | 713/324 |
| 2006/0140577 A1* | 6/2006 | Ninomiya et al. ............... | 386/46 |
| 2007/0043477 A1* | 2/2007 | Ehlers et al. ................... | 700/276 |
| 2007/0124608 A1 | 5/2007 | Knowlson et al. | |
| 2010/0008117 A1* | 1/2010 | Luthi et al. .................... | 363/126 |

* cited by examiner

*Primary Examiner* — Sean Shechtman
(74) *Attorney, Agent, or Firm* — Lowe Graham Jones PLLC

(57) ABSTRACT

Electronic device communication systems and methods are operable to decrease power consumption in an electronic device during user defined power conservation periods. An exemplary embodiment identifies an occurrence of a start of a user defined power conservation period, maintains power to a first group of components in the electronic device, and shuts off a second group of components in the electronic device in response to the occurrence of the start of the user defined power conservation period.

21 Claims, 2 Drawing Sheets

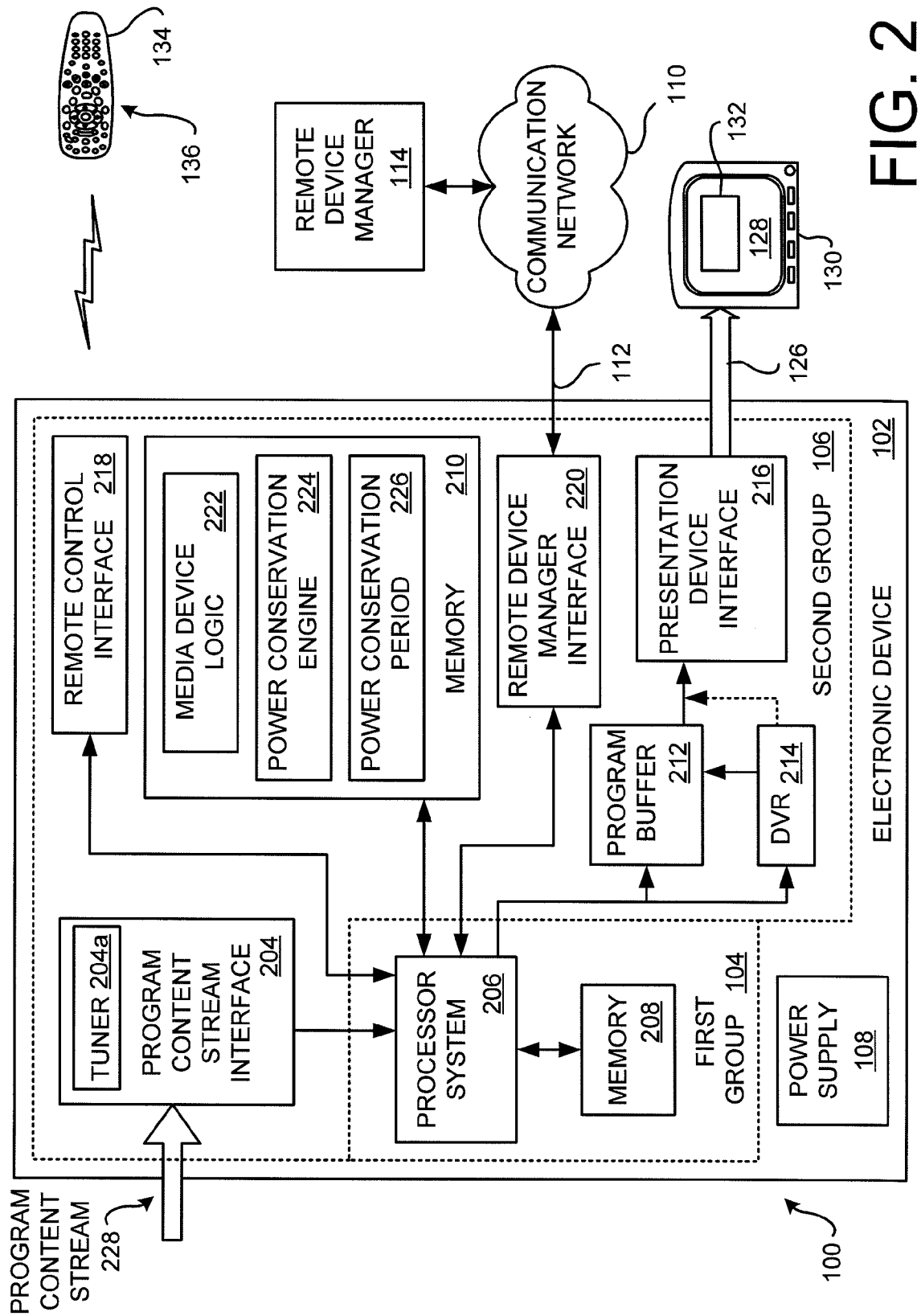

APPARATUS, SYSTEMS AND METHODS FOR USER DEFINED POWER CONSERVATION PERIODS

BACKGROUND

Electronic devices, such as a set top box, a stereo, a television, a computer system, a game system, or the like, are often located at a user's premises. At those times when the user is not actively using the electronic device, the electronic device may be consuming power so as to remain in a readiness state in the event that the user begins to use the electronic device. Accordingly, when the user begins to use the electronic device, undesirable start up delays are avoided. However, electrical power consumed by these electronic devices while operating in the readiness state may be an unnecessary expense that is paid for by the user.

In view that it is desirable to reduce energy costs for the user, there is a need in the arts to reduce power consumption in electronic devices during periods that the user will not be using the electronic device.

SUMMARY

Systems and methods of decreasing power consumption in an electronic device during user defined power conservation periods are disclosed. An exemplary embodiment identifies an occurrence of a start of a user defined power conservation period, maintains power to a first group of components in the electronic device, and shuts off a second group of components in the electronic device in response to the occurrence of the start of the user defined power conservation period.

BRIEF DESCRIPTION OF THE DRAWINGS

Preferred and alternative embodiments are described in detail below with reference to the following drawings:

FIG. 2 is a block diagram of an exemplary power manager implemented in an exemplary media-type electronic media device.

DETAILED DESCRIPTION

Figure 1:
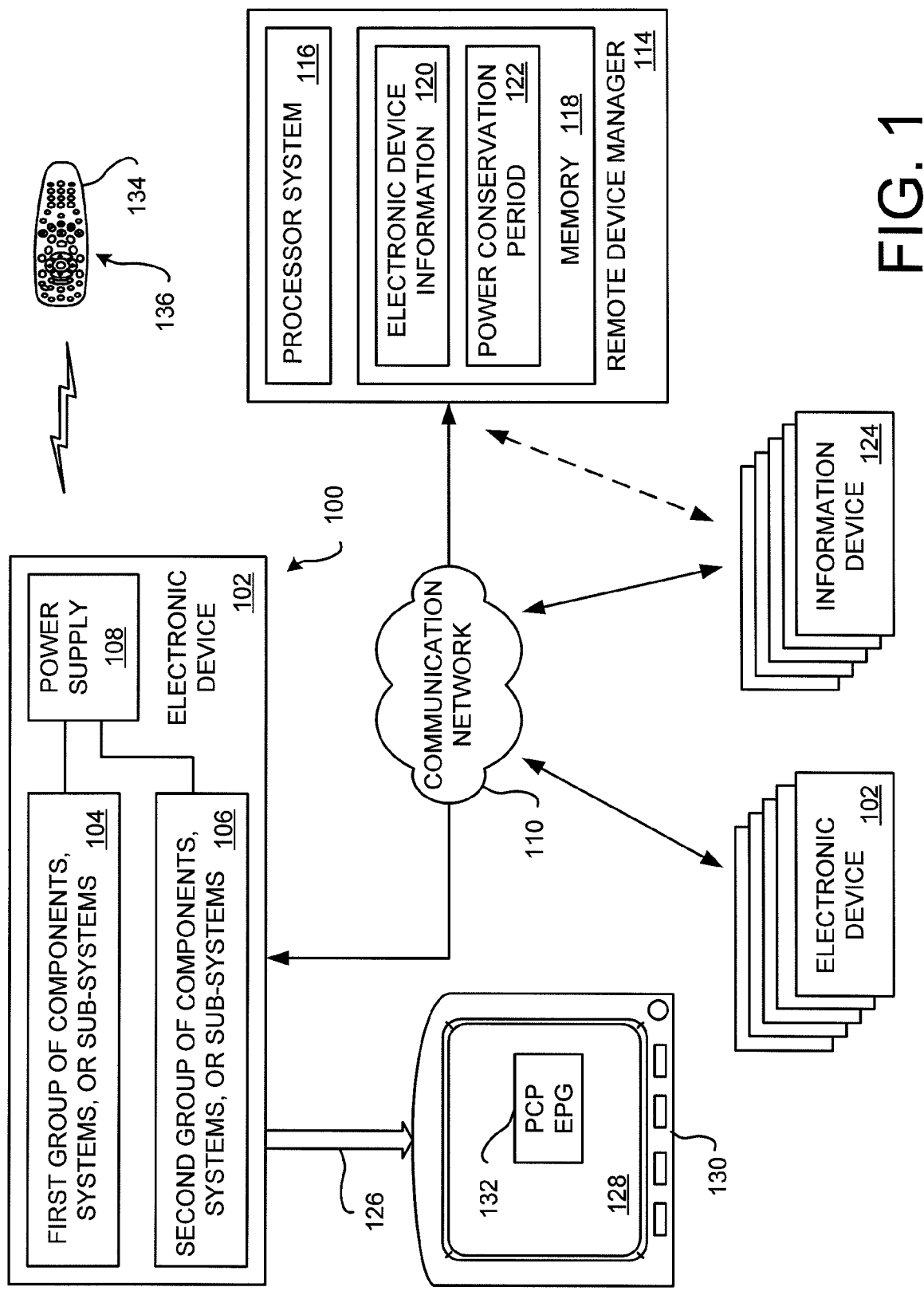
FIG. 1 is a block diagram of an embodiment of a power manager implemented in an electronic device.

FIG. 1 is a block diagram of an embodiment of a power manager 100 implemented in an electronic device 102. The electronic device 102 comprises a first group of components 104, a second group of components 106, and a power supply 108. Examples of the electronic device 102 include, but are not limited to, set top boxes (STB), stereos, surround-sound receivers, radios, televisions (TVs), digital video disc (DVD) players, digital video recorders (DVRs), game playing devices, or personal computers (PCs). The power supply 108 may be an energy source, such as a battery, a generator, a fuel cell, a solar cell, or another electrical power generating device. Alternatively, or additionally, the power supply 108 may be a power connection interface configured to electrically couple the electronic device 102 to a power grid or the like (not shown).

Operating in a "readiness state" enables the electronic device 102 to quickly respond to a user's input without the need for a lengthy startup process that would otherwise occur as various components of the electronic device 102 "warm up" and become operational. However, when the electronic device 102 is operating in the readiness state, the electronic device 102 is not responding to any particular user instructions, and is likely not performing any useful tasks. Further, the electronic device 102 is consuming power. During such times, the cost of the consumed power may be a needless expense since the electronic device 102 is not likely to be used.

Embodiments of the power manager 100 place the electronic device 102 into a power conservation mode of operation during user defined power conservation periods. Since the user knows with reasonable certainty when they will likely not be using the electronic device 102, the user specifies the date and/or times for one or more power conservation periods based upon their anticipated electronic device 102 use schedule.

Components of the electronic device 102 that perform essential functions are defined as members of the first group of components 104. When operating in the power conservation mode, the electronic device 102 continues to provide power to the first group of components 104 so that essential functions of the electronic device 102 are maintained.

Components of the electronic device 102 that do not perform essential functions are defined as members of the second group of components 106. When operating in the power conservation mode, the electronic device 102 shuts off or otherwise disables the second group of components 106 so that the total power consumption of the electronic device 102 is reduced during the power conservation period. Since the selected components are not consuming power, the cost of power consumed by the electronic device 102 is reduced. Further, embodiments of the power manager 100 reduce energy consumption and increase attendant environmental quality benefits realized through energy conservation.

For example, power might by provisioned to a processor or the like so that a clock and/or calendar function is maintained during the power conservation period. Here, the end time of the power conservation period must be tracked so that the electronic device 102 may resume full functionality after the conclusion of the power conservation period. Thus, tracking the end time of the power conservation period is an exemplary essential function. Accordingly, the processor or the like performing the function of monitoring for occurrence of the end time of the power conservation period is an essential component that is predefined as a member of the first group of components 104.

Essential functions may be identified based on design considerations of the electronic device 102 and/or may be identified based on intended functionality of the electronic device 102 with respect to its operating environment. Any particular component of the electronic device 102 may be defined as either a member of the first group 104 or the second group 106.

For example, a media-type electronic device 102 may be configured to receive information from a remote source. In one application where receipt of information from the remote source may be delayed, information receiving components of the electronic device 102 may be defined as members of the second group of components 106 that are shut off or otherwise disabled during the power conservation period. On the other hand, a different application may require that the media-type electronic device 102 be capable of receiving at least some information from the remote source, such as an emergency "wake up" notification that terminates the power conservation period. In this application, the information receiving components may be essential, and therefore, may be defined as members of the first group of components 104.

The user defines the power conservation period by specifying a date and/or day, and a time period, that defines when the electronic device 102 will be operating in the power conservation mode. The user may define a power conservation period that spans multiple days, weeks, or even months.

The power conservation period may be defined in terms of calendar days (month and date of day) or may be defined by specification of particular days of the week. The power conservation period may be defined by a specified start time and a specified end time. Alternatively, the power conservation period may be defined by a specified start time and a duration. When the duration of the power conservation period is specified, the end time may be determined based on the specified start time plus the duration.

For example, the user may know with reasonable certainty that they will not be using the electronic device 102 from 11:00 p.m. to 6:00 a.m. during the work week (e.g.: Sunday night through Thursday). The user may also know with reasonable certainty that they will not be using the electronic device 102 from 1:00 a.m. to 5:00 a.m. during the weekend (e.g., Friday and Saturday). Further, the user may know with reasonable certainty that they will not be using the electronic device 102 from 2:00 a.m. to 6:30 a.m. on holidays and/or specified vacation dates.

In the example above, the user may specify a first power conservation period for Sunday through Thursday, by specifying a start time at 11:00 p.m., and by specifying an end time at 6:00 a.m. for the following morning. Embodiments of the power manager 100 define the first power conservation period to occur on Sundays through Thursdays, where the start time of the power conservation period is 11:00 p.m. and the end time of the power conservation period is 6:00 a.m.

The user may specify a second power conservation period for Saturday and Sunday, by specifying a start time at 1:00 a.m. and a duration of four hours. Embodiments of the power manager 100 define the second power conservation period to occur on Saturday and Sunday, where the start time of the power conservation period is 1:00 a.m. and the end time of the power conservation period is 5:00 a.m.

The user may specify a third power conservation period for selected holidays and selected dates corresponding to the holidays and/or the scheduled vacation days by specifying a start time at 2:00 a.m. and by specifying an end time at 6:30 a.m. Embodiments of the power manager 100 define the third power conservation period to occur on specified dates of the holidays and/or vacation days, where the start time of the power conservation period is 2:00 a.m. and the end time of the power conservation period is 6:30 a.m.

Embodiments of the power manager 100 monitor the current date (or day) and time. Upon the occurrence of the date (or day) and the time for the start of a predefined power conservation period, the process of operating in the power conservation mode is initiated. When the power conservation period starts, the second group of components 106 is shut off or is otherwise disabled so that they do not consume power. At the conclusion of the power conservation period, the second group of components 106 is re-powered. The second group of components 106 are then active so that they are ready for operation in the event that the user begins to use the electronic device 102.

In some embodiments, the electronic device 102 may be communicatively coupled to a communication network 110 via a connection 112. A remote device manager 114 may then send communications to and/or receive communications from the electronic device 102 via the communication network 110.

An exemplary embodiment of the remote device manager 114 comprises a processor system 116 and a memory 118. The memory 118 is configured to store electronic device information 120 and a plurality of power conservation periods 122.

The electronic device information 120 is information that is communicated at some point to the electronic device 102. For example, the electronic device information 120 may include software updates, information updates, or other information of interest that is used by the receiving electronic device 102.

In applications where the electronic device 102 communicates with the remote device manager 114, the electronic device 102 may advise the remote device manager 114 of its scheduled power conservation period(s). The remote device manager 114 stores the scheduled power conservation period information into a particular one of the power conservation periods 122. Further, the remote device manager 114 stores an identifier of that particular electronic device 102 into the power conservation period 122.

From time to time, the remote device manager 114 may need to communicate the electronic device information 120 to the electronic device 102. However, the electronic device 102 may not be able to receive the electronic device information 120 when operating in its power conservation mode. Since the remote device manager 114 has previously stored the times of the scheduled power conservation period for that particular electronic device 102, the remote device manager 114 may then buffer or continue to store the electronic device information 120 for later communication to the electronic device 102. When the power conservation period concludes and the electronic device 102 exits operation from the power conservation mode, the remote device manager 114 may then communicate the buffered or stored electronic device information 120 to the electronic device 102.

In an exemplary embodiment, the electronic device information 120 may be automatically communicated at the conclusion of the power conservation period. Alternatively, the electronic device information 120 may be held for some predefined duration after the conclusion of the power conservation period, and then may be communicated to the electronic device 102. In some embodiments, the remote device manager 114 may notify the electronic device 102 that the electronic device information 120 is available, and that the electronic device information 120 will be communicated after the electronic device 102 responds or otherwise request the information from the remote device manager 114.

The remote device manager 114 may be communicatively coupled to a plurality of other electronic devices 102. For example, the electronic device information 120 may be intended to be communicated to many different ones of the plurality of other electronic devices 102. The remote device manager 114 may communicate the electronic device information 120 to those electronic devices 102 not operating in a power conservation mode. For any of the electronic devices 102 that are operating in a power conservation mode, the electronic device information 120 may be buffered or stored for later communication to those electronic devices 102.

Further, the remote device manager 114 may be communicatively coupled to one or more information devices 124 that may have electronic device information 120 that needs to be communicated to the plurality of other electronic devices 102, or to a particular one of the electronic devices 102. The information device 124 may cooperatively operate with the remote device manager 114 so that their particular electronic device information 120 is eventually received by those electronic devices 102 that are operating in the power conservation mode.

For example, the electronic device information 120 may be communicated from the information devices 124 directly to the remote device manager 114. The remote device manager 114 may then manage transfer of the information to the plurality of electronic devices 102.

Alternatively, or additionally, the electronic device information 120 may be communicated from the information devices 124 to the plurality of electronic devices 102 and to the remote device manager 114. Since the remote device manager 114 is configured to determine which ones of the plurality of electronic devices 102 are operating in a power conservation mode, the remote device manager 114 may buffer or store the electronic device information 120 for later communication to the electronic devices 102 after their respective power conservation periods conclude.

Alternatively, or additionally, the electronic device information 120 may be communicated from the information devices 124 to the plurality of electronic devices 102. In some situations, the information device 124 may determine that the communicated electronic device information 120 has not been received or processed by some of the electronic devices 102 (such as when the non-receiving or non-responding electronic devices 102 are operating in a power conservation mode). For example, but not limited to, the electronic device 102 operating in a power conservation mode may return a message or notification that the electronic device information 120 was not received. For such non-responsive electronic devices 102, the information device 124 may communicate the electronic device information 120 to the remote device manager 114. The remote device manager 114 may buffer or store the electronic device information 120 for later communication to the electronic devices 102 after the non-receiving or non-responding electronic devices 102 conclude their respective power conservation periods. Alternatively, or additionally, the information device 124 may resend the electronic device information 120 to the non-responsive electronic devices 102 at a later time.

In some instances, the electronic device 102 may request authorization from the remote device manager 114 to implement a scheduled power conservation period. The remote device manager 114 may then compare the start time and the end time of the power conservation period for that particular electronic device 102 with other scheduled events. If there is a conflict, the remote device manager 114 may refuse or otherwise deny authorization of the power conservation period.

Embodiments of the power manager 100 may be implemented in media devices that present content 126 on a display 128 for viewing by the user. For example, the electronic device 102 may be communicatively coupled to a television 130 and/or have its own display 128.

Embodiments that are communicatively coupled to the display 128 may be configured to present a power conservation period (PCP) electronic program guide (EPG) 132 to assist the user in specifying a power conservation period. The PCP EPG 132 is a type of a user interface that presents a menu, or a series of menus, that use a combination of text and symbols to indicate information that may be selected by the user to specify the date, the day, the start time, the end time, and/or the duration of a power conservation period.

The PCP EPG 132 has the look and feel of a table with information describing available selection options. The PCP EPG 132 is interactive with the user. The user, via a remote control 134 that is in communication with the electronic device 102 that is controlling presentation of the PCP EPG 132 on the display 128, is able to "scroll" or "navigate" about the PCP EPG 132 to specify the information that is used to define the power conservation period. When the user highlights the portion of the PCP EPG 132 corresponding to selected information using their remote control 134, the user may actuate one or more actuators 136 to cause the electronic device 102 to specify the information for the power conservation period. For example, if the user is specifying the start time, the user may interactively scroll through a clock or other timer. When the desired start time is indicated on the PCP EPG 132, the user may actuate one of the actuators 136 to specify the indicated time as the start time for the power conservation period. The end time may be similarly specified by the user. A calendar or the like may be displayed on the PCP EPG 132 for specifying the date and/or day of the power conservation period.

Alternatively, or additionally, the user may specify the date, the day, the start time, the end time, and/or the duration of a power conservation period using any suitable user interface. For example, the user may specify the date, the day, the start time, the end time, and/or the duration of a power conservation period directly by operating the actuators 136 on the remote control 134. Actuators may be included on the electronic device 102 that may be used to specify the date, the day, the start time, the end time, and/or the duration of a power conservation period.

FIG. 2 is a block diagram of an exemplary power manager 100 implemented in an exemplary media-type electronic device 102. The exemplary electronic device 102 illustrated in FIG. 2 corresponds to a set top box (STB) that is configured to process received video and/or audio content. Embodiments of the power manager 100 may be implemented in other various media-type electronic devices 102 such as, but not limited to, a stereo, a surround-sound receiver, a radio, a television (TV), a digital video disc (DVD) player, a digital video recorder (DVR), a cellular phone equipped with video functionality, a personal device assistant (PDA), a game playing device, or a personal computer (PC).

The non-limiting exemplary media-type electronic device 102 comprises a program content stream interface 204, a processor system 206, an optional first memory 208, a second memory 210, a program buffer 212, an optional digital video recorder (DVR) 214, a presentation device interface 216, a remote control interface 218, and an optional remote device manager interface 220. The memory 210 comprises portions for storing the media device logic 222, the power conservation engine 224, and one or more power conservation periods 226. Other electronic devices 202 may include some, or may omit some, of the above-described media processing components. Further, additional components not described herein may be included in alternative embodiments.

Processes performed by the electronic device 102 are generally implemented by the processor system 206 while executing the media device logic 222. In some embodiments, the media device logic 222 and the power conservation engine 224 may be integrated together, and/or may be integrated with other logic.

The exemplary electronic device 102, here the exemplary STB, is configured to provide video and/or audio content that is received in one or more program content streams 228. The program content stream 228 typically comprises a plurality of programs multiplexed together into a transport channel. The one or more program content streams 228 are communicated to the electronic device 102 from a media system sourced from a remote head end facility (not shown) operated by a media provider. Non-limiting examples of such media systems include satellite systems, cable system, and the Internet. For example, if the program provider provides programming via a satellite-based communication system, the electronic device 102 is configured to receive one or more broadcasted satellite signals detected by an antenna (not shown). Alternatively, or additionally, the program content stream 228 can be received from one or more different sources, such as, but not limited to, a cable system, a radio frequency (RF) communication system, or the Internet.

The one or more program content streams 228 are received by the program content stream interface 204. One or more tuners 204a in the program content stream interface 204 selectively tune to one of the program content streams 228 in accordance with instructions received from the processor system 206. The processor system 206 parses out program content associated with the program of interest based upon a request for a program of interest specified by a user. The program of interest is then assembled into a stream of video and/or audio information which may be stored by the program buffer 212 such that the program content can be streamed out to the media presentation device, such as a television (not shown), via the presentation device interface 216. Alternatively, or additionally, the parsed out program content may be saved into the DVR 214 for later presentation.

The processor system 206 may perform a variety of functions, including maintaining a clock, a calendar, and/or a timer that is used by embodiments of the power manager 100 for scheduling power conservation periods. The processor system 206 retrieves and executes the power conservation engine 224 so that, at predefined or specified dates, days, times, and/or durations, the electronic device 102 operates in the power conservation mode. Accordingly, the processor system 206 in this exemplary embodiment is an essential component, and is therefore predefined to be a member of the first group of components 104.

When the electronic device 102 is operating in a power conservation mode, the processor system 206 monitors real time to identify the occurrence of the end time of the power conservation period. At least the end time of the power conservation period must be stored in the memory 208. Accordingly, the memory 208 in this exemplary embodiment is an essential component, and is therefore predefined to be a member of the first group of components 104.

Other components are predefined to be members of the second group of components 106. For example, the program content stream interface 204, and the one or more tuners 204a, are consuming power when receiving the program content stream 228. However, since the user is not likely going to be using the electronic device 102 during the power conservation period, the program content stream interface 204, and the one or more tuners 204a, could be shut off or otherwise disabled to conserve power. Accordingly, the program content stream interface 204, and the one or more tuners 204a, in this exemplary embodiment are not essential components, and are therefore predefined to be members of the second group of components 106.

Since the program content stream interface 204, and the one or more tuners 204a, will not be operational during the power conservation period, the program buffer 212, the DVR 214, and the presentation device interface 216 will not be processing received program content. Accordingly, these components are not essential, and are therefore predefined to be members of the second group of components 106.

The remote control interface 218 is configured to detect incoming wireless radio frequency signals and/or infrared signals transmitted to it by the remote control 134. The remote control interface 218 consumes power when monitoring for reception of wireless signals from the remote control 134. Since the user is not likely to be using the electronic device 102 during the power conservation period, the remote control interface 218 will likely not be receiving any wireless signals from the remote control 134. Accordingly, the remote control interface 218, in this exemplary embodiment is not an essential component, and is therefore predefined to be a member of the second group of components 106.

The remote device manager interface 220 is configured to receive incoming electronic device information 120 from the remote device manager 114 and/or the information devices 124. Accordingly, the remote device manager interface 220 includes a transceiver, receiver, or the like (not shown). The remote device manager interface 220 also consumes power when monitoring for reception of electronic device information 120. Since the user is not likely to be using the electronic device 102 during the power conservation period, power may be optionally conserved by shutting off or otherwise disabling the remote device manager interface 220. Accordingly, in this exemplary embodiment, the remote device manager interface 220 is not an essential component, and is therefore predefined to be a member of the second group of components 106.

Depending upon the type of memory media that the memory 210 is implemented on, the memory 210 may consume power. For example, the memory 210 may be implemented as a disk drive type memory. Since the user is not likely to be using the electronic device 102 during the power conservation period, the media device logic 222 will not need to be accessed by the processor system 206. Here, power may be optionally conserved by shutting off or otherwise disabling the memory 210. Accordingly, the memory 210, in this exemplary embodiment is not an essential component, and is therefore predefined to be a member of the second group of components 106.

Summarizing the above-described example implementation of the embodiment of the power manager 100, the first group of components 104 comprises the processor system 206 and the memory 208. The second group of components 106 comprises the program content stream interface 204, the tuners 204a, the program buffer 212, the DVR 214, the presentation device interface 216, the remote control interface 218, the remote device manager interface 220, and the memory 210. A list of components defined as members of the first group of components 104 and as members of the second group of components 106 may be stored in the memory 208, in the memory 210, or in another suitable memory media. The members of the first group of components 104 and/or the second group of components 106 may be defined based on user specifications or may be predefined, such as, but not limited to, manufacturer or vendor specifications.

In practice, the processor system 206 retrieves and executes the power conservation engine 224. The start dates/days and the start time of any predefined power conservation periods are stored in the corresponding power conservation periods 224 stored in the memory 210, or alternatively, are stored in the memory 208. When the occurrence of the start of one of the power conservation periods is determined, the processor system 206 causes the second group of components 106 to become shut off or otherwise disabled. Power consumption by the exemplary electronic device 102 decreases since the program content stream interface 204, the tuners 204a, the program buffer 212, the DVR 214, the presentation device interface 216, the remote control interface 218, the remote device manager interface 220, and the memory 210 are no longer consuming power.

The end time of the power conservation period is stored in the memory 208 (or alternatively, is stored in the memory 210 in embodiments where the memory 210 is a member of the first group of components 104). The processor system 206 monitors real time to identify the end of the power conservation period. Upon the occurrence of the end of the power conservation period, the processor system 206 repowers the second group of components 106. Accordingly, the program content stream interface 204, the tuners 204a, the program buffer 212, the DVR 214, the presentation device interface 216, and the memory 210 are operational such that program content may be received and processed. The remote control interface 218 becomes operational such that signals may be received from the remote control. Further, the remote device manager interface 220 becomes operational such that signals may be received from the remote device manager 114.

The components that are members of the second group of components 106 may be shut off or otherwise disabled in any suitable manner. For example, but not limited to, switches or the like (not shown) may be used to disconnect the component from the power supply 108.

Some embodiments may be configured with multiple second groups of components 106. Accordingly, different levels of power conservation may be implemented based upon user defined instructions.

It should be emphasized that the above-described embodiments of the power manager 100 are merely possible examples of implementations of the invention. Many variations and modifications may be made to the above-described embodiments. All such modifications and variations are intended to be included herein within the scope of this disclosure and protected by the following claims.

The invention claimed is:

1. A method that decreases power consumption in an electronic device during user defined power conservation periods, the method comprising:
presenting a power conservation period (PCP) electronic program guide (EPG) on a display controlled by the electronic device,
wherein a user selects at least one of a presented date and a presented day that are presented on the displayed PCP EPG to specify a start of the user defined power conservation period, and
wherein the user selects a first presented time that is presented on the displayed PCP EPG to specify a start time of the user defined power conservation period;
identifying an occurrence of the start of the user defined power conservation period;
maintaining power to a first group of components residing in the electronic device; and
shutting off a second group of components residing in the electronic device in response to the occurrence of the start of the user defined power conservation period,
wherein the electronic device is at least one of a set top box, a television, a surround-sound receiver, a digital video disc player, and a game playing device,
wherein members of the second group of components that are shut off in response to the occurrence of the start of the user defined power conservation period include a remote control interface configured to receive wireless signals from a remote control.

2. The method of claim 1, further comprising:
identifying an end of the user defined power conservation period; and
repowering the second group of components in the electronic device in response to an occurrence of the end of the user defined power conservation period.

3. The method of claim 1, wherein the user defined power conservation period corresponds to a period wherein the user anticipates that they will not be using the electronic device.

4. The method of claim 1, further comprising:
receiving a specification of at least one of a date and a day that defines the start of the user defined power conservation period;
receiving the specification of the start time that defines the start of the user defined power conservation period; and
receiving a specification of at least one of an end time and a duration that defines an end of the user defined power conservation period.

5. The method of claim 4, wherein the specifications are received from the user prior to the start of the user defined power conservation period.

6. The method of claim 4, further comprising:
determining the end time based upon the start time and the duration.

7. The method of claim 4,
wherein the user selects one of a second presented time and the duration to specify the end of the user defined power conservation period.

8. The method of claim 1, further comprising:
defining a plurality of first components of the electronic device as members of the first group of components, wherein the first group of components perform essential functions during the power conservation period, wherein the essential functions are functions to be performed by the electronic device using the first group of components that remain operational during the power conservation period; and
defining a plurality of second components of the electronic device as members of the second group of components, wherein the second group of components perform non-essential functions that do not need to be performed during the power conservation period, wherein the non-essential functions are functions that are not performed by the electronic device during the power conservation period.

9. The method of claim 1, wherein the members of the second group of components that are shut off in response to the occurrence of the start of the user defined power conservation period further include at least one tuner configured to receive a stream of program content.

10. A method that manages communication of electronic device information to an electronic device during user defined power conservation periods, the method comprising:
receiving the electronic device information at a remote device manager, wherein the electronic device information is to be communicated from the remote device manager to the electronic device;
monitoring the electronic device for operation in a user defined power conservation mode,
wherein the electronic device is operating a first group of components residing in the electronic device that perform essential functions during the user defined power conservation period, wherein the essential functions are functions to be performed by the electronic device using the first group of components that remain operational during the power conservation period,
wherein the electronic device is not operating a second group of components residing in the electronic device that do not perform essential functions during the user defined power conservation period, wherein the functions performed by the second group of components are functions that are not performed by the electronic device during the power conservation period,
wherein the electronic device is at least one of a set top box, a television, and a surround-sound receiver, and wherein members of the second group of components that are shut off in response to the occurrence of the start of the user defined power conservation period include at least one tuner configured to receive a stream of program content;

communicating the electronic device information to the electronic device when the electronic device is not operating in the power conservation mode; and storing the electronic device information for later communication to the electronic device when the electronic device is operating in the power conservation mode, wherein the electronic device is also at least one of a digital video disc player and a game playing device, and wherein the members of the second group of components that are shut off in response to the occurrence of the start of the user defined power conservation period further include a remote control interface configured to receive wireless signals from a remote control.

11. The method of claim 10, further comprising:

monitoring the electronic device for a conclusion of the operation in the power conservation mode; and communicating the electronic device information to the electronic device in response to the conclusion of the operation in the power conservation mode.

12. The method of claim 10, further comprising:

monitoring the electronic device for a conclusion of the operation in the power conservation mode;

communicating information to the electronic device that the electronic device information is available;

monitoring for a response from the electronic device requesting communication of the electronic device information; and communicating the electronic device information to the electronic device in response to receiving the request to communicate the information.

13. The method of claim 10, wherein monitoring the electronic device for operation in the power conservation mode comprises:

receiving information corresponding to at least one of a start date and a start day of the user defined power conservation period;

receiving information corresponding to at least one of a start time of the user defined power conservation period;

receiving information corresponding to at least one of an end time of the user defined power conservation period;

receiving an identifier of the electronic device, wherein the identifier uniquely identifies the electronic device from a plurality of electronic devices; and storing the received identifier of the electronic device and the received information.

14. The method of claim 13, further comprising:

monitoring for the occurrence of the at least one of the start date and the start day of the user defined power conservation period; and monitoring for the occurrence of the start time of the user defined power conservation period.

15. The method of claim 10, wherein the electronic device is a first electronic device operating in a first power conservation mode, and further comprising:

communicating the electronic device information to a second electronic device not operating in a second power conservation mode.

16. The method of claim 10, further comprising:

receiving the electronic device information from an information device at the remote device manager.

17. A system that decreases power consumption by an electronic device during a user defined power conservation period, wherein the electronic device is at least one of a set top box, a television, a surround-sound receiver, a digital video disc player, and a game playing device, the system comprising:

a first group of components residing in the electronic device, wherein members of the first group of components perform essential functions, wherein the essential functions are functions to be performed by the electronic device using the first group of components that remain operational during the power conservation period; and a second group of components residing in the electronic device, wherein members of the second group of components do not perform essential functions, wherein the functions performed by the second group of components are functions that are not performed by the electronic device during the power conservation period, wherein power to the first group of components is maintained, wherein the second group of components are shut off or are disabled in response to an occurrence of a start of the user defined power conservation period, and wherein members of the second group of components that are shut off in response to the occurrence of the start of the user defined power conservation period comprise:

at least one tuner configured to receive a stream of program content; and a remote control interface configured to receive wireless signals from a remote control.

18. The system of claim 17, wherein members of the first group of components comprise:

a memory configured to store an end time of the user defined power conservation period; and a processor system communicatively coupled to the memory and configured to determine an end of the user defined power conservation period based upon the end time.

19. The system of claim 17, wherein members of the first group of components comprise:

a remote device manager interface configured to receive electronic device information from a remote device manager.

20. The system of claim 17, wherein members of the first group of components comprise:

a memory configured to store a plurality of user defined power conservation periods, wherein each of the plurality of user defined power conservation periods is based upon a user specification of at least one of a date and a day that defines the start of the user defined power conservation period, a user specification of a start time that defines the start of the user defined power conservation period, and a user specification of at least one of an end time and a duration that defines an end of the user defined power conservation period.

21. The system of claim 17, further comprising:

a display controlled by the electronic device; and a processor system communicatively coupled to the display and configured to generate a power conservation period (PCP) electronic program guide (EPG) that is communicated to the display for presentation on the display, wherein a user selects at least one of a presented date and a presented day that are presented on the displayed PCP EPG to specify the start of the user defined power conservation period, wherein the user selects a first presented time that is presented on the displayed PCP EPG to specify the start time of the user defined power conservation period, and
wherein the user selects one of a second presented time and a presented duration to specify the end of the user defined power conservation period.

* * * * *